March 13, 1928.

A. O. ABBOTT, JR 1,662,596

APPARATUS FOR CUTTING SINGLE OR PLIED-UP STOCK

Filed July 30. 1926

INVENTOR:-
Adrian O. Abbott, Jr.
BY
Ernest Hopkinson
ATTORNEY

March 13, 1928.

A. O. ABBOTT, JR 1,662,596

APPARATUS FOR CUTTING SINGLE OR PLIED-UP STOCK

Filed July 30, 1926   3 Sheets-Sheet 2

INVENTOR:-
Adrian O. Abbott, Jr.
BY
Ernest Hopkinson
ATTORNEY

March 13, 1928.
A. O. ABBOTT, JR
1,662,596
APPARATUS FOR CUTTING SINGLE OR PLIED-UP STOCK
Filed July 30, 1926   3 Sheets-Sheet 3
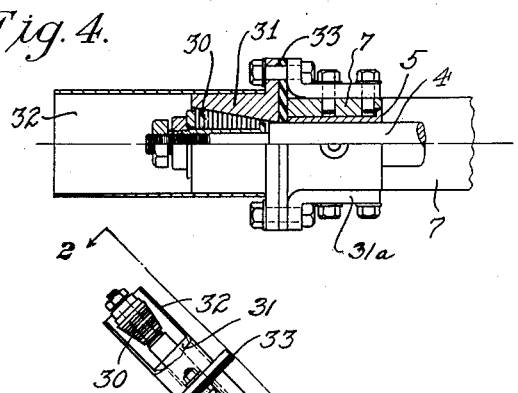
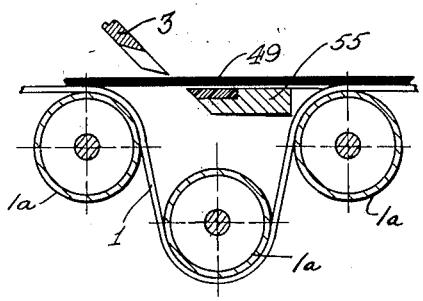
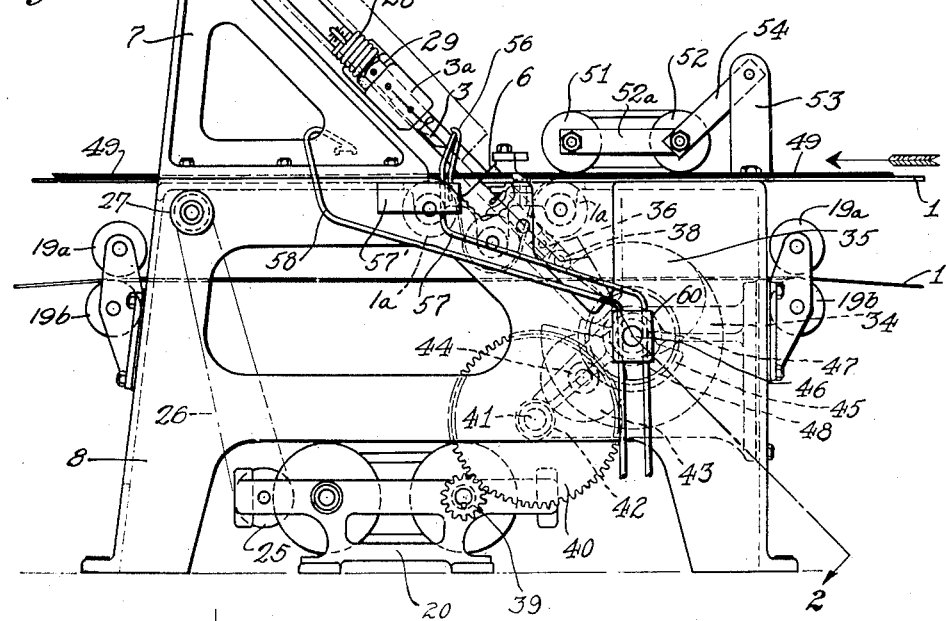
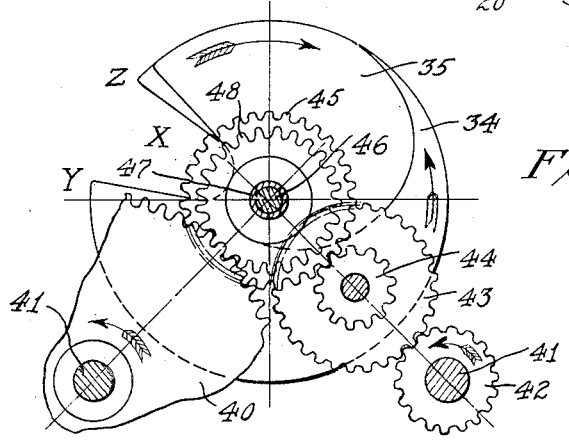
INVENTOR:—
Adrian O. Abbott, Jr.
BY
Ernest Hopkinson
ATTORNEY Patented Mar. 13, 1928.

1,662,596

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

APPARATUS FOR CUTTING SINGLE OR PLIED-UP STOCK.

Application filed July 30, 1926. Serial No. 125,931.

This invention relates to a cutting and measuring machine and more particularly to a combination of a conveyor and cutting machine whereby continuous single or plied-up stocks of rubber compositions can be automatically cut into predetermined lengths without stopping the conveyor. This machine is particularly adapted for cutting tread stocks for tires with or without a breaker strip which is ordinarily applied in preparing stock for the manufacture of pneumatic tires. It is, however, adapted for use in many other lines of manufacture.

Heretofore when cutting material, such as tread stock, it has been necessary to stop the conveyor supplying the stocks to be cut, for each cutting operation. Since the cutting operation occurs at frequent intervals, this recurrent stopping causes very considerable loss of time, thereby limiting production.

It is an object of this invention to provide a combination of a conveyor and cutting machine whereby stocks may be continuously supplied to the cutting machine and cut without stopping the conveyor. Another object is to provide an adjustable control for varying the length of the strip to be cut as desired.

A feature of the invention is the cam mechanism provided for causing a quick return or upstroke of the knife. Another feature is the provision of a variable speed mechanism and control means therefor by which the relative distance traveled by the conveyor per cycle of operations of the cutting machine may be regulated. Another feature of the invention is the form of knife employed whereby a shearing action is obtained in cutting. Another feature is the spring adjustment used in connection with the cutting knife to vary the force of the cut for different thicknesses of stock. Still another feature is the arrangement for wetting the knife blade just prior to each cut and for blowing away the excess water from the stock after the cutting operation.

Briefly the invention consists in a cutting machine and conveyor in which a knife is positioned above the conveyor at any desired angle. The lower ends of the knife supports have pinioned at their extremities rollers which ride upon the edge of slotted cams. When the slots are presented below the rollers during rotation of the cams, the rollers together with the knife supports drop into the slots, carrying the knife downward for the cutting stroke. As the rollers drop to the bottom of the cam slots other cams revolving in the opposite direction and at a much higher rate of speed engage the rollers and lift the knife member to its former position. These other cams uphold the rollers and knife supports until the slots of the first mentioned cams have passed, when the rollers once more are caused to rest against the edge of the slotted cams. Thus one cutting operation takes place for each revolution of the slotted cams. A variable speed mechanism controls the relative distance traveled by the conveyor per revolution of the slotted cams thereby determining the length of the stock cut. As the knife is about to descend on its cutting stroke, it is sprayed with water mist thereby wetting the edge of the knife to assist in cutting the stock. When the stock has passed the cutter, an air line blows away any excess water.

The invention will best be understood if the following detailed description is read in connection with the accompanying drawings, in which;

Figure 4 is a view in partial section showing the knife stop and rebound check;

Figure 5 is a section through the center of the cutting machine showing the cutting block or stationary blade, and the method of passing the belt conveyor safely around the cutting members;

Figure 6 is a left side elevation of the cutting machine showing the several parts and operating mechanism;

Figure 7 is a schematic diagram of the operating cams and driving gears.

Figure 1:
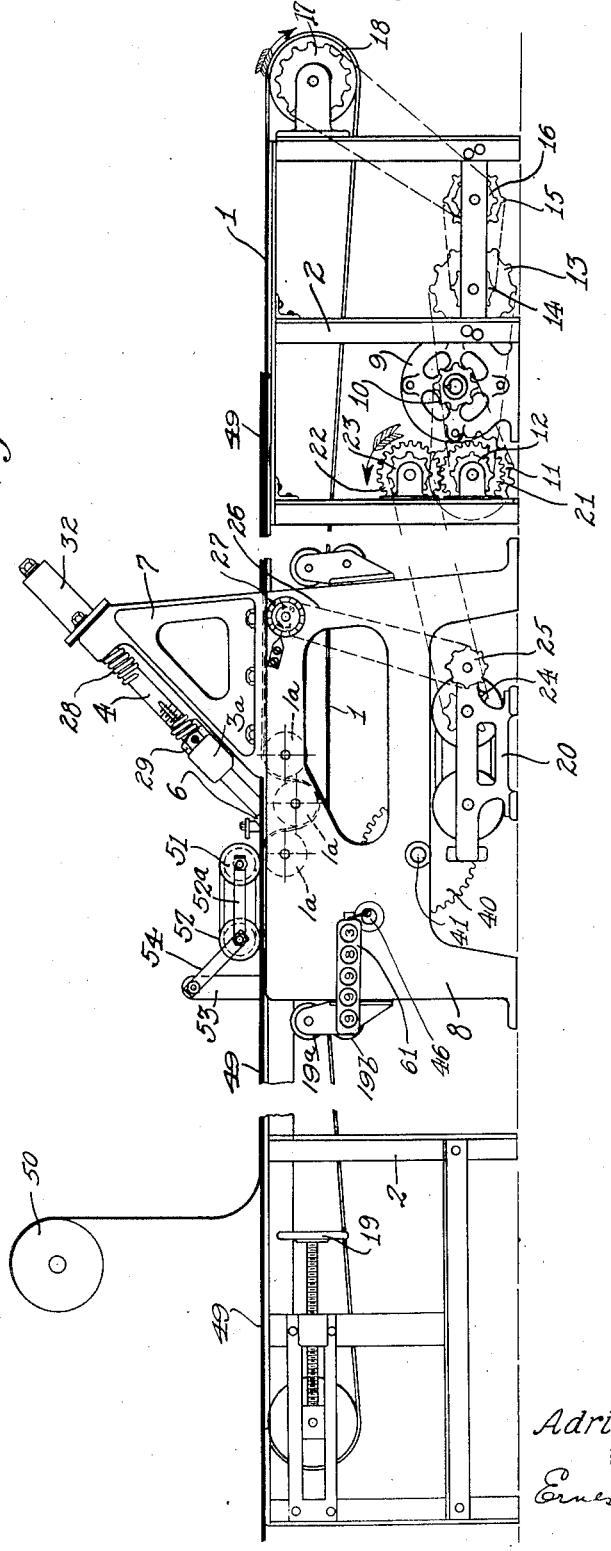
Figure 1 is an elevation of a development of this invention showing the cutting machine, conveyor, and driving mechanism.

The conveyor 1 is supported on tables 2. Between the tables a knife 3 of the guillotine type is mounted upon a cutter bar 3ª which is rigidly secured between two bars or supporting members 4 which slide diagonally with respect to the conveyor in the spaced pairs of bearings 5 and 6, carried by the frames 7 and 8 respectively. Directly below the knife or severing means 3, the conveyor is diverted from its path over an arrangement of rolls 1ª forming a gap permitting the conveyor belt to pass locally beneath the path of the knife. The conveyor 1 is driven by motor 9 through the sprocket, chain, speed reducing trains 10, 11, 12, 13, 14, 15, 16, and 17 and the pulley 18. The belt is adjusted at its proper tension by any suitable take-up device such as 19 and is guided in its return movement by the rolls 19ª and 19ᵇ. A well-known speed changing device 20, such as the "Reeves variable speed transmission", is provided and is driven from motor 9 through the gears 21 and 22 and the sprockets 10, 11, 23 and 24. The gears serve to give the desired direction of rotation to the various members, and can be used as change gears to furnish a wider range in speed ratio between the conveyor belt and the cutting machine than is afforded by the speed changing device 20. The variable speed device 20 is connected through sprocket 25 and chain 26 with graduated disk and hand wheel 27 by means of which the relative distance traveled by the conveyor belt per cycle of operations of the cutting machine is controlled.

The bars 4 on which the knife 3 is mounted are inclined at the proper angle to give the desired skived cut to material being fed through the machine. In order to supplement the force of gravity in giving desired force to the knife, coil springs 28 are provided surrounding the knife bearing bars 4 above the knife bearing at one end against nuts 29 on the bars 4 and at the other end against the bearings 5. These springs are compressed against the bearings 5 on the upward stroke of the knife thereby gathering energy for the downward stroke. Since the machine is adapted to cutting material of various thicknesses such as single or multiply stock, the nuts 29 are threaded upon the bars 4 for adjusting the compression of the springs whereby the force of the cutting stroke may be varied as desired. At the upper end of each of the bars 4 is a special stop and rebound check (Figure 4) consisting of a bumper 30 carried by each of bars 4 and made of leather or other suitable yieldable material. A flanged conical cup-shaped member 31 constituting an abutment member is supported on the frame 7 in the path of each of the stops as follows: A flanged clamp 31ª is secured to the frame 7. The cup 31 is affixed to the clamp with a pad 33 of rubber composition or other yieldable material such as leather interposed therebetween. The angle of the inner surface of this conical cup shaped member is such that it grips the leather bumper, when they are forced together by actuation of the knife, sufficiently to prevent the knife slide assembly from undesirable rebounding. The rebound action is sufficient, however, to break the grip of the conical cup-shaped member so that the knife member can be readily raised by cam action. The bumper is protected by a tubular guard 32 extending well above its top. The rubber pad 33 helps absorb the shock of stopping the downward stroke of the knife. This shock is small when the knife is cutting but is severe when there is no stock under the knife.

The knife 3 while straight is preferably longitudinally grooved in a V-shape to provide a shear action in cutting. The entire knife slide assembly is actuated by the two pairs of cams 34 and 35 shown in Figs. 2, 6 and 7. Cams 34 are supporting discs for the knife slide assembly, each of which discs is provided with a slot as shown in Fig. 7 and is rotated in a counter clockwise direction, as viewed in Fig. 6. Cams 35 are lifting cams for the knife slide assembly and are rotated in a direction opposite to the discs 34 about the same central axis. At the lower ends of the knife supporting bars or rods 4 are fixed slotted blocks 36 in which the rolls 38 are rotatably mounted by means of pins 37. The rolls 38 are adapted to be passed into the slots of the cams 34 when the slots are brought into alignment with their respective rolls. The cams 34 are driven by the variable speed transmission 20 through gears 39 and 40, shaft 41, gears 42, 43, 44 and 45 and shaft 46 upon which the cams 34 are mounted. Shaft 46 is rotatably mounted in the frame 8. The high spots of the cams are equidistant from the shaft 46. The cams 35 are mounted upon a quill shaft 47 supported from frame 8 by supports 47ª and driven from the variable speed transmission 20 through the gears 39, 40 and 48. Cams 35 are driven in the opposite direction to cams 34 and at a higher rate of speed and are so timed in their operation as to force the knife slide assembly out of the slots in the cams or discs 34 to the rear end of its path immediately after the knife has effected its cutting stroke. In Fig. 7 shaft 41 is shown in two locations in order to separate the gear trains and to show their arrangement more clearly. The cams 35 are each constructed with a high spot, the surface of which is concentric with the surface of cams 34 and equally distant from their centers. The high spot of cam 35 rises gradually from a low portion which is approximately the same distance from their centers as the base of the slot in cam 34.

In operation the stock 49 is fed onto the conveyor from any desired source, such as 50. In the case of plied up stocks several plies may be fed to the conveyor from any desired sources. The stock is carried by the conveyor under the rollers 51 and 52 which are held in spaced relation by arms 52ª and are coupled together by a belt. They are pivotally suspended from the post 53 by link 54 so that they ride on top of the stock just ahead of the cutting knife to assist in pushing the stock across the lower cutting blade 55 which is affixed rigidly to the frame 8 (see Fig. 5) and across the gap formed by the offset portion of the conveyor to the portion thereof beyond the knife. These rollers also serve to prevent the stock from jumping away from the knife after each cut. When the knife is in raised position the rollers 38 will be riding on the outer edge of the disks 34. As edge Y on each disc 34 passes rollers 38, the slots are brought directly in alignment with the path of the rollers thereby removing support from the knife slide assembly and the latter drops to the extent of the depth of the slots, cutting the sheet material. While the knife slide assembly is falling toward the bottom of the slot X cams 35 revolving in a direction opposite to that of cams 34, as indicated in Figure 7, but at a much faster rate than cams 34, engage the rollers 38, with the gradually sloping wall leading to the high spot and lift the knife member to its former position. The peripheries of the high spots of the cams 35 being equidistant from the center of rotation with the peripheries of cams 34 for a distance hold the rollers 38 out of the slots until the edges Z pass from under the rollers when the rollers once more ride on the cams 34 until the edges X again pass from under them permitting the knife slide assembly to drop for the next cut.

Figure 2:
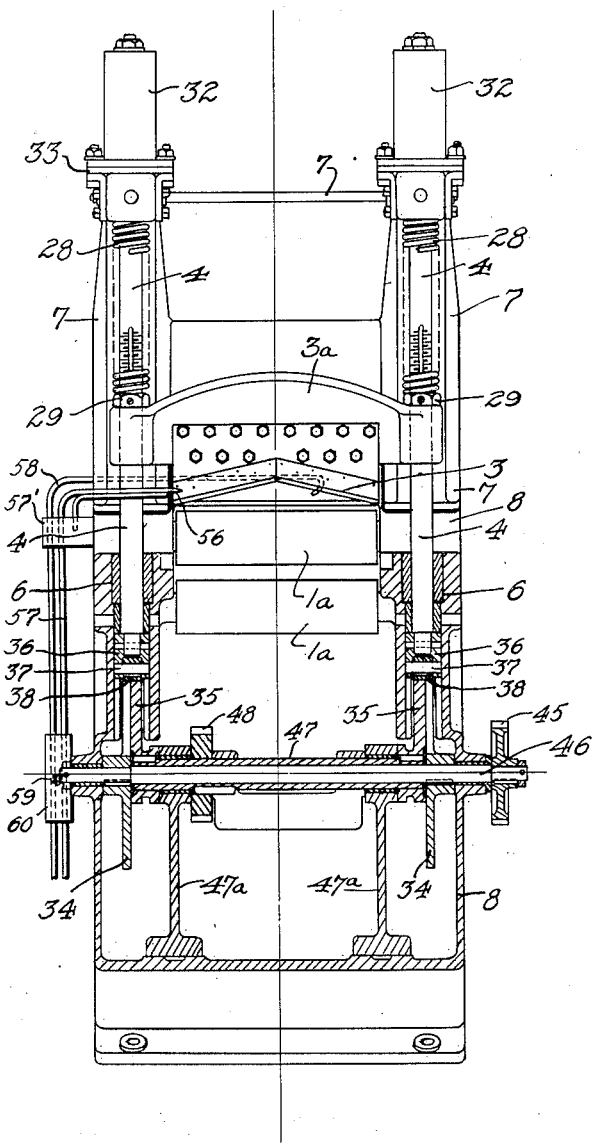
Figure 2 is a sectional view on the line 2—2 of Figure 6 showing the cam mechanism for operating the knife.
Figure 3:
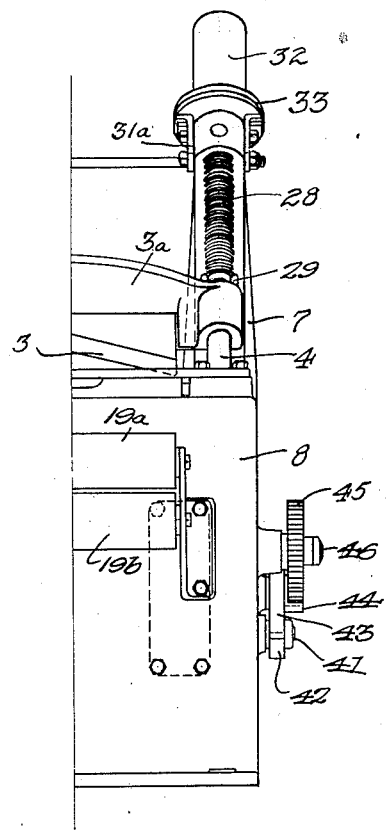
Figure 3 is an end elevation of the cutter showing the right half of the machine.

In Figures 2 and 6 an arrangement is shown for wetting the knife to facilitate the cutting of the stock. As the knife is about to descend it is sprayed with water mist by means of the nozzle 56 connected with the compressed air line 57 and the tank of water 57'. When the stock has passed the cutter the excess water is blown from the surface of the stock by compressed air from the air line 58. The action of both the air lines 57 and 58 is controlled by the cam 59 on the end of the shaft 46 operating valves in valve casing 60 which is carried by the frame 8. Supported on the frame 8 is any suitable form of counter 61 operated from shaft 46.

As many different embodiments of this invention may be made without departing from the spirit thereof, it will be understood that I do not intend to limit myself to the specific embodiment herein set forth except as indicated in the following claims.

Having thus described my invention what I claim and desire to protect by Letters Patent is:—

1. An apparatus for cutting sheet material comprising a knife, supporting means rigidly affixed thereto, means for guiding the same in reciprocating movement, a conveyor for conducting sheet material across the path of the knife, means for actuating the conveyor, means for moving the knife supporting means whereby the knife is carried away from the conveyor and for maintaining the same in this position for a predetermined length of time, means for thrusting the knife supporting means forwardly to effect a cutting stroke, and means for adjusting the force with which the knife is thrust forward.

2. An apparatus for cutting sheet material comprising a knife, supporting means rigidly affixed thereto, means for guiding the same in reciprocating movement, a conveyor for passing sheet material across the path of the knife, means for actuating the conveyor, cams, the peripheries of which are adapted to be engaged by the knife supporting means, means for actuating the cams to move the knife supporting means whereby the knife is conducted away from the conveyor, rotatable means for holding the knife supporting means in this position for a predetermined time and for releasing the same, and means for thrusting the knife supporting means forwardly to effect a cutting stroke.

3. An apparatus for cutting sheet material comprising a knife, supporting means rigidly affixed thereto, means for guiding the same in reciprocating movement, a conveyor for passing sheet material across the path of the knife, means for actuating the conveyor, cams, the peripheries of which are adapted to be engaged by the knife supporting means, means for actuating the cams to move the knife away from the conveyor, slotted circular discs the peripheries of which are adapted to be engaged by the knife supporting means for holding the knife in this position for a predetermined length of time and for releasing the same, means for actuating the discs, and means for thrusting the knife forwardly when released.

4. An apparatus for cutting sheet material comprising a knife, supporting means rigidly affixed thereto, means for guiding the same in reciprocating movement, means for conducting sheet material across the path of the knife, rotatable means adapted to be engaged by the supporting means for forcing the knife to inoperative position, rotatable means adapted to be engaged by the supporting means for maintaining the knife in this position and for intermittently releasing the same, and means for rotating the first and second mentioned rotatable means in opposite directions.

5. An apparatus for cutting sheet material comprising a knife, supporting means rigidly affixed thereto, means for guiding the same in reciprocating movement, slotted circular discs the peripheries of which are adapted to be engaged by said supporting means, means for rotating the discs whereby the slots are brought into the path of travel of the knife supporting means, means for passing the knife supporting means into the slots to effect the cutting stroke, rotatable cams adjacent the discs and having a common center of rotation therewith, the peripheries of said cams being adapted to be engaged by the knife supporting means and having a rise at least as great as the depths of the slots of the discs, means for rotating the cams whereby the knife supporting means are removed from the slots, and means for feeding the sheet material into the path of the knife.

6. An apparatus for cutting sheet material comprising a knife, supporting means rigidly affixed thereto, means for guiding the same in reciprocating movement, slotted circular discs the peripheries of which are adapted to be engaged by the knife supporting means, means for rotating the discs whereby the slots are brought into the path of travel of the knife supporting means, means for passing the knife supporting means into the slots to effect the cutting stroke, rotatable cams adjacent the discs and having a common center of rotation therewith, the peripheries of said cams being adapted to be engaged by the knife supporting means and having a rise at least as great as the depth of the discs, means for rotating the cams in a direction opposite to that of said discs, and means for passing sheet material across the path of the knife.

7. An apparatus for cutting sheet material comprising a knife, supporting members rigidly affixed to the knife, means for guiding the same in reciprocating movement, rotatable discs each having a slotted periphery adapted to be engaged by the knife supporting members, means for rotating the discs whereby the slots are brought into the path of travel of the knife supporting members, means for passing the knife supporting members into the slots to effect a cutting stroke of the knife during each revolution of the discs, means for removing said knife supporting members from the slots, and means for passing sheet material across the path of the knife.

8. An apparatus for cutting sheet material comprising a knife, means for actuating the same to make a cutting stroke at predetermined intervals, means for passing sheet material across the path of the knife, means for wetting the knife prior to each cutting operation and means for removing moisture from the surface of the sheet material after the cutting operation.

9. An apparatus for cutting sheet material comprising a knife, means for actuating the same to make a cutting stroke, means for passing the sheet material across the path of the knife, means for wetting the knife of the knife prior to the cutting operation, and fluid means for removing wetting material from the sheet material after the cutting operation.

10. An apparatus for cutting sheet material comprising a knife, supporting members rigidly affixed to the knife, means for guiding the same in reciprocating movement, means for passing sheet material across the path of the knife, means for actuating the knife to effect a cutting stroke, yieldable stops carried by the knife supporting members, and abutment members carried by the guiding means adapted to cooperate with the stops to limit the extent of the cutting stroke.

11. An apparatus for cutting sheet material comprising a knife, supporting members rigidly affixed to the knife, means for guiding the same in reciprocating movement, means for passing sheet material across the path of the knife, means for actuating the knife to effect a cutting stroke, stops associated with the knife supporting members, abutment members associated with the guiding means adapted to cooperate with the stops to limit the extent of the cutting stroke, the cooperating surfaces of the stops and abutment members extending diagonally to the direction of travel of the knife.

12. An apparatus for cutting sheet material comprising a knife, supporting members rigidly affixed to the knife, means for guiding the same in reciprocating movement, means for passing sheet material across the path of the knife, means for actuating the knife to effect a cutting stroke, stops associated with the knife supporting members, abutment members associated with the guiding means adapted to cooperate with the stops to limit the extent of the cutting stroke, the cooperating surfaces of the stops and abutment members extending diagonally to the direction of travel of the knife, at least one of the engaging surfaces being constructed of yieldable material.

Signed at Detroit, county of Wayne, State of Michigan, this 26th day of July, 1926.

ADRIAN O. ABBOTT, Jr.